United States Patent
Cao et al.

(10) Patent No.: US 12,483,787 B2
(45) Date of Patent: Nov. 25, 2025

(54) PHOTOGRAPHIC IMAGE PROCESSING METHOD AND DEVICE

(71) Applicants: Sony Group Corporation, Tokyo (JP); Sony (China) Limited, Beijing (CN)

(72) Inventors: Yijun Cao, Shanghai (CN); Jianfeng Zhu, Shanghai (CN)

(73) Assignees: SONY GROUP CORPORATION, Tokyo (JP); SONY (CHINA) LIMITED, Beijing (CN)

( * ) Notice: Subject to any disclaimer, the term of this patent is extended or adjusted under 35 U.S.C. 154(b) by 85 days.

(21) Appl. No.: 18/578,018

(22) PCT Filed: Jul. 18, 2022

(86) PCT No.: PCT/CN2022/106268
§ 371 (c)(1),
(2) Date: Jan. 10, 2024

(87) PCT Pub. No.: WO2023/001107
PCT Pub. Date: Jan. 26, 2023

(65) Prior Publication Data
US 2024/0334059 A1    Oct. 3, 2024

(30) Foreign Application Priority Data
Jul. 19, 2021  (CN) .......................... 202110812518.5

(51) Int. Cl.
*H04N 23/68*    (2023.01)
*G06T 7/246*    (2017.01)
*H04N 23/80*    (2023.01)

(52) U.S. Cl.
CPC ........... *H04N 23/683* (2023.01); *G06T 7/248* (2017.01); *H04N 23/6811* (2023.01);
(Continued)

(58) Field of Classification Search
CPC .. H04N 23/683; H04N 23/6811; H04N 23/80; H04N 23/61; H04N 23/71;
(Continued)

(56) References Cited

U.S. PATENT DOCUMENTS 7,702,131 B2 *   4/2010   Chinen ................ H04N 5/2625
                                                     348/94
9,836,831 B1   12/2017   Krishnaswamy et al.
(Continued)

FOREIGN PATENT DOCUMENTS

CN     110166700 A    8/2019
CN     111800581 A    10/2020
(Continued)

OTHER PUBLICATIONS

International Search Report and Written Opinion mailed on Oct. 10, 2022, received for PCT Application PCT/CN2022/106268, filed on Jul. 18, 2022, 10 pages including English Translation.

*Primary Examiner* — Timothy J Henn
(74) *Attorney, Agent, or Firm* — XSENSUS LLP

(57) ABSTRACT

Provided is an electronic device for processing a series of images, the series of images being obtained by shooting a scene containing a static object and a dynamic object, the electronic device comprises a processing circuit which is configured to: select a particular image containing the static object among the series of images; generate a motion trajectory of the dynamic object in at least some of the series of images; and obtain a final image on the basis of both of the particular image and the generated motion trajectory of the dynamic object.

18 Claims, 6 Drawing Sheets

(52) U.S. Cl.
CPC ... *H04N 23/80* (2023.01); *G06T 2207/10016* (2013.01); *G06T 2207/10024* (2013.01); *G06T 2207/30241* (2013.01)

(58) Field of Classification Search
CPC ........... G06T 7/248; G06T 2207/10016; G06T 2207/10024; G06T 2207/30241; G06T 2207/20081; G06T 5/50
See application file for complete search history.

(56) References Cited

U.S. PATENT DOCUMENTS

| | | | |
|---|---|---|---|
| 9,928,628 B2 | 3/2018 | Windmark | |
| 2009/0208062 A1* | 8/2009 | Sorek | H04N 23/951 |
| | | | 382/313 |
| 2010/0265357 A1* | 10/2010 | Liu | H04N 23/70 |
| | | | 348/E9.051 |
| 2014/0111662 A1* | 4/2014 | Mashiah | G06T 13/80 |
| | | | 348/222.1 |
| 2019/0019320 A1* | 1/2019 | Ravindran | G06T 7/215 |
| 2019/0213712 A1* | 7/2019 | Shoa Hassani Lashdan | |
| | | | G06T 5/70 |
| 2019/0251683 A1* | 8/2019 | Safdarnejad | H04N 23/951 |
| 2019/0279378 A1* | 9/2019 | Takahashi | G06T 7/223 |

FOREIGN PATENT DOCUMENTS

| | | |
|---|---|---|
| CN | 111932587 A | 11/2020 |
| CN | 112887623 A | 6/2021 |

* cited by examiner

PHOTOGRAPHIC IMAGE PROCESSING METHOD AND DEVICE

CROSS-REFERENCE OF RELATED APPLICATIONS

This application is a national stage of International Application No. PCT/CN2022/106268, filed on Jul. 18, 2022, which claims the benefit of priority to CN application No. 202110812518.5 filed on Jul. 19, 2021, both of the aforementioned applications are hereby incorporated by reference in their entireties.

FIELD OF THE INVENTION

The present disclosure relates to image processing, and in particular to photographic image processing.

BACKGROUND

With the increasing popularity of electronic photographic equipment, such as various digital cameras, portable devices equipped with photographic equipment, etc., people are increasingly using electronic photographic equipment to obtain photos, videos, etc. of various scenes.

In the photography process, photos with various effects are usually obtained by adjusting various parameters. One of the commonly used parameters is shutter speed, which is a parameter that controls the exposure time when taking photos. In actual shooting, different effects can be achieved by adjusting the shutter speed. Slow shutter means obtaining a long exposure by reducing the shutter speed and extending the shutter time to achieve special dynamic effects. For example, the slow shutter speed can be employed to capture the flow sense of water and clouds, and record bright trajectories of moving objects, such as the light trails of vehicle driving, when shooting night scenes.

Unless otherwise stated, it should not be assumed that any of the methods described in this section become prior art only because they are included in this section. Similarly, unless otherwise stated, the problems recognized about one or more methods should not be assumed to be recognized in any prior art on the basis of this section.

DISCLOSURE OF THE INVENTION

An object of the present disclosure is to improve shot image processing, so that high-quality images with slow shutter photographic effects can be obtained.

In an aspect of the present disclosure, there is provided an electronic device for processing a series of images, the series of images being obtained by shooting a scene containing a static object and a dynamic object, the electronic device can include a processing circuit which can be configured to generate a processed image which does not contain image content relevant to the dynamic object, based on a particular image containing the static object selected among the series of images; generate a motion trajectory of the dynamic object in at least some of the series of images; and obtain a final image on the basis of both of the processed image and the generated motion trajectory of the dynamic object.

In an aspect of the present disclosure, there is provided a method for processing a series of images, the series of images being obtained by shooting a scene containing a static object and a dynamic object, the method can include: generating a processed image which does not contain image content relevant to the dynamic object, based on a particular image containing the static object selected among the series of images; generating a motion trajectory of the dynamic object in at least some of the series of images; and obtaining a final image on the basis of both of the processed image and the generated motion trajectory of the dynamic object.

In yet another aspect, there is provided a device for processing a series of images, the device can include at least one processor and at least one storage device having instructions stored thereon, the instructions, when executed by the at least one processor, may cause the at least one processor to execute the method as described herein.

In yet another aspect, there is provided a storage medium having stored instructions which, when executed by a processor, may cause execution of the method as described herein.

In yet another aspect, there is provided a computer program product comprising instructions which, when executed by a processor, cause the processor to execute the method as described herein.

In yet another aspect, there is provided a computer program comprising instructions which, when executed by a computer, cause the computer to execute the method as described herein.

Other features of the present disclosure will become apparent from the following description of exemplary embodiments with reference to the accompanying drawings.

DESCRIPTION OF THE DRAWINGS

The accompanying drawings, which are incorporated in and constitute a part of this specification, illustrate embodiments of the present disclosure and, together with the description, serve to explain the principles of the invention. In the drawings, similar reference numbers indicate similar items.

Figure 1:
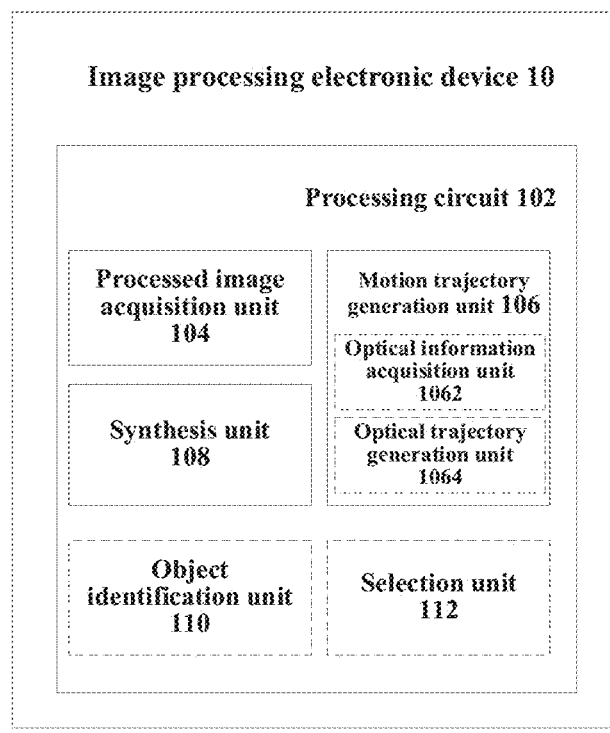
FIG. 1 shows a block diagram of an electronic device for image processing according to an embodiment of the present disclosure.

Although embodiments of this disclosure may be susceptible to various modifications and alternative forms, the embodiments of the present disclosure are shown by way of example in the drawings and are described in detail herein. However, it should be understood that the drawings and detailed description thereof are not intended to limit the embodiments to the particular forms disclosed, on the contrary, the intention is to cover all modifications, equivalents, and alternatives falling within the spirit and scope of the claims.

DETAILED DESCRIPTION OF PREFERRED EMBODIMENTS

Hereinafter, exemplary embodiments of the present disclosure will be described with reference to the accompanying drawings. For the sake of clarity and conciseness, not all features of the embodiments are described in the description. However, it should be understood that many implementation-specific settings must be made during the implementation of the embodiments in order to achieve specific goals of developers, for example, to meet those constraints related to equipment and business, and these constraints may vary with different implementations. In addition, it should be understood that although the development work may be very complicated and time-consuming, it is only a routine task for those skilled in the art who benefit from this disclosure.

Here, it should also be noted that in order to avoid obscuring the present disclosure by unnecessary details, only processing steps and/or equipment structures closely related to the schemes at least according to the present disclosure are shown in the drawings, while other details not closely related to the present disclosure are omitted.

Hereinafter the embodiments of the present disclosure will be described with reference to the drawings. It should be noted that similar reference numerals and letters indicate similar items in the drawings, and therefore, once an item is defined in one drawing, there is no need to discuss it for subsequent drawings.

In this disclosure, the terms "first", "second" and the like are only used to distinguish elements or steps, and are not intended to indicate time sequence, preference or importance.

Currently, when an electronic photographic equipment is used for shooting, different effects can be achieved by adjusting the shutter. In particular, a slow shutter mode is often used to achieve special dynamic effects by extending the shutter time. However, when shooting in the slow shutter mode, if the exposure time is long, then a slight shake during the shooting process will cause problems such as blurring of a static object in a final image. In existing photography operations, in order to take photos with slow shutter photographic effects, it is necessary to use a tripod to fix the photographic equipment, and then perform long exposure. However, this will increase the burden on the photographer and cannot effectively suppress the negative impact caused by shake.

However, there is currently no relevant software technology for cameras to solve the jitter problem during slow shutter photography. Therefore, an improved techniques is needed to obtain improved images with slow shutter photographic effects.

The present disclosure proposes a technology for processing a set of images, especially a piece of video data or a set of images shot over a certain period of time (for example, equal to the shutter setting time), wherein such a set of images are analyzed and processed for a static object and a dynamic object, and based on specific static object images and dynamic object trajectories, a photo with similar slow shutter photographic effects can be generated.

It should be noted that the solution of the present disclosure belongs to an improved image processing, which can simulate the slow shutter photographic effects by acquiring a piece of video data or a set of images and performing image processing on the video data/images, regardless of a shooting mode of the camera, such as camera shutter mode settings, especially slow shutter shooting mode. In particular, in the slow shutter shooting mode of camera, the final image is generated based on optical device imaging after the shutter time expires, which means that only one final image will be obtained in the slow shutter shooting mode. However, the disclosure will process a piece of video data or a set of images. In particular, a piece of video data or a set of images can be obtained by continuously shooting using a camera, and the shooting mode, including shutter settings, etc. can be conventional settings, and only the shooting time length needs to be set appropriately, for example, the shooting time length may be equal to a commonly used slow shutter time length or any other suitable time length.

It should be noted that instead of simply performing anti-shake processing in videos, the present disclosure selects, optimally processes, and combines the shot video data/the set of images, even if there is jitter when the video/photo is shot, even though there may be jitter in the shot videos/photos, a high-quality photo with slow shutter photographic effects can be finally obtained.

Image processing according to the present disclosure will be described in detail below with reference to the accompanying drawings.

FIG. 1 shows a block diagram of a device for image processing for a series of images according to an embodiment of the present disclosure. As shown in FIG. 1, the device 10 includes a processing circuit 102 configured to generate a processed image which does not contain image content relevant to the dynamic object, based on a particular image containing a static object selected among the series of images; generate a motion trajectory of the dynamic object in at least some of the series of images; and obtain a final image on the basis of both of the processed image and the generated motion trajectory of the dynamic object.

In an embodiment of the present disclosure, a series of images are obtained by shooting a scene containing at least one of a static object and a dynamic object. In some embodiments, the series of images is shot by a camera over a specific period of time. For example, they can be shot continuously or at specific time intervals. In some embodiments, the series of images are obtained by using a photographic device to perform shooting over a specific period of time in a case of the photographic device being not fixed. The shooting period, that is, the shooting duration, may be appropriately set, for example corresponding to the shutter speed setting. As an example, when shooting with a hand-held photographic device, a user will obtain a piece of video data that essentially contains multiple frames of data, that is, multiple frames of images, which can be used as a series of images to be processed. For example, the number of a series of images to be processed may be different, with reference to the parameters of a slow shutter mode and the setting of the shooting duration. For example, when the set parameter of 30 frames of data per second is used for shooting over 2 seconds, the images to be processed thus obtained will contain 30×2=60 frames of images. It should be noted that the series of images to be processed may be all images shot over a specific time period, or a part of the images thereof, such as images selected randomly or at equal intervals.

In an embodiment of the present disclosure, the static object and the dynamic object in video data are processed separately, so various appropriate ways can be used to identify and distinguish the static object and the dynamic object in an image collection. In particular, all images can be parsed, and the static object and the dynamic object in the entire video can be distinguished by comparing the pixel information at each position in the image while in a case of allowing a certain offset.

In some embodiments, the processing circuit can be configured to identify an object which exists in each image in the series of images and whose position deviation is less than a specific threshold as the static object. In particular, a static object should be an object that remains substantially fixed during the entire shooting process, and therefore appears as an object that exists in all frame data of the video and whose position offset is within a certain error, the specific threshold/error can be set empirically, or can be obtained based on data analysis in the training image set or previously shot images.

In other embodiments, the processing circuit can be configured to identify an object which does not exist in all images in the series of images, or an object which exists in all images in the series of images and whose position deviation is larger than a specific threshold, as the dynamic object. In particular, during the image identification process, in addition to the identified static object, other objects in the image can often be regarded as dynamic objects, a dynamic object can, for example, appear as an object moving in video data, whose position deviation will be larger than a certain threshold, or an object entering or leaving the video shooting range during shooting, etc. The threshold here may be the specific threshold as described previously, or a threshold set otherwise.

In particular, the identification of static object and dynamic object can be performed in all video data one by one or at specific intervals. As an example, certain video data in the video data, such as the first video data or the last video data, can be selected as a reference, with which all other video data can be compared. In addition, the identification of static object and dynamic object can be performed by a processing circuit, or by a device other than the processing circuit included in the electronic device, or even by a device other than the electronic device that can obtain the shot video data, which can identify the image and provide the identification result to a processing circuit of the electronic device.

According to an embodiment of the present disclosure, the processing for a static object can be performed based on a particular image containing the static object selected from the series of images. In some embodiments, the particular image is an image in the series of images in which the static object meets specific requirements. The specific requirements are relevant to the characteristics, needs, etc. of the shot images, and meeting the specific requirements may include, for example, the photographic effects are best and clearest, the personal expressions are best and have the best colors, or even if not clear enough, the personal expressions, forms and so on of a person are the most satisfactory.

As an example, a particular image is an image selected from a series of images in which the static object behaves better. For example, among multiple frames included in a piece of video data shot by a camera over a specific period of time, a frame in which a static object behaves better is selected from respective frames included in the video as a static object frame, and serves as the aforementioned particular image. Among them, that the static object behaves better refers to that the static object has good clarity, form, color, etc. so as to meet the specific requirements, and in particular, if there are multiple images that meet the specific requirements, the selected particular image is one image which is the best.

The selection of the particular image can be performed in a number of suitable ways. In some embodiments, selection from a series of images may be based on a static object template/model. According to some embodiments, the processing circuit can be further configured to compare each image in the series of images to a static object template and select an image in the series of images that has the highest proximity to the static object template as the particular image. The static object template may be a template obtained for various requirements, such as a template with high definition, with good facial expression, with good object color, with good form, etc. The proximity can be the proximity between the static object in the image and the static object template with respect to at least one of clarity, personal expression, form, and color. Of course, the proximity may also be a proximity with respect to other types of information, especially information relevant to the aforementioned specific requirements.

In some embodiments, the static object template/model is obtained through training, in particular, the static object template is a static object data model trained based on a training image set. In some embodiments, the static object template/model is obtained based on a training data set provided in advance. In some embodiments, at least some of the images shot each time may be added to the training data set. In other embodiments, the static object template/model can be updated dynamically, such as being retrained when the training data set changes. That the training data set changes may include, but are not limited to, such as the training data set is regularly replaced with a new training data set, the training data set is regularly updated by adding additional training data, and so on.

In an embodiment of the present disclosure, processing for an static object may include processing the particular image to remove dynamic object image content therefrom, thereby obtaining an image/frame data containing only the static object, as a reference image for obtaining the final image.

According to an embodiment of the present disclosure, the processing circuit may be further configured to replace contents relevant to the dynamic object in the particular image with background contents. As an example, the dynamic object can be removed from a selected static object particular image/frame, for example, the pixel content area of the dynamic object can be removed therefrom, and background pixel information of this area can be recovered with reference to pixel information in other image/frame data at similar positions, and the recovered frame data can be used as the reference image for final imaging.

In some embodiments, the processing circuit may be further configured to: screen out an image from the series of images in which the dynamic object position does not coincide with the dynamic object position in the particular image and the static object position has the smallest deviation from the static object position in the particular image; and determine the background content based on the content in the screened-out image at a position corresponding to the dynamic object position in the particular image. In some examples, the position of the static object in the screened-out image is consistent with the position of the static object in the particular image, then a content in the screened-out image which is located at a position corresponding to the position of dynamic object in the particular image and is of the same size as that in the particular image can serve as the background content. In other examples, if there is a deviation between the position of the static object in the screened-out image and the position of the static object in the particular image, then the content in the screened-out image which is located at a position corresponding to the dynamic object position in the particular image and is adjusted based on the deviation value can serve as the background content.

Exemplary processing for a particular image according to an embodiment of the present disclosure will be described below with reference to the accompanying drawings.

Figure 2A:
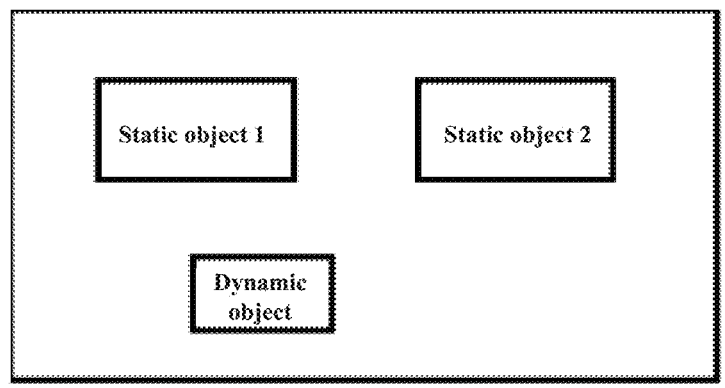
FIG. 2A to 2D illustrate schematic diagrams of background content replacement according to an embodiment of the present disclosure.

First, for a particular image of a static object, a dynamic object and some static objects are identified in the image data, as shown in FIG. 2A, assume that the shooting duration is 2 seconds, and 30 frames are shot per second, and assume that the 15th frame data is the particular image/frame data selected in the video data, where two static objects, static object 1 and static object 2, and one dynamic object are identified. It should be noted that the numbers of static objects and dynamic objects in the figure are exemplary, and they may be other numbers.

Figure 2B:
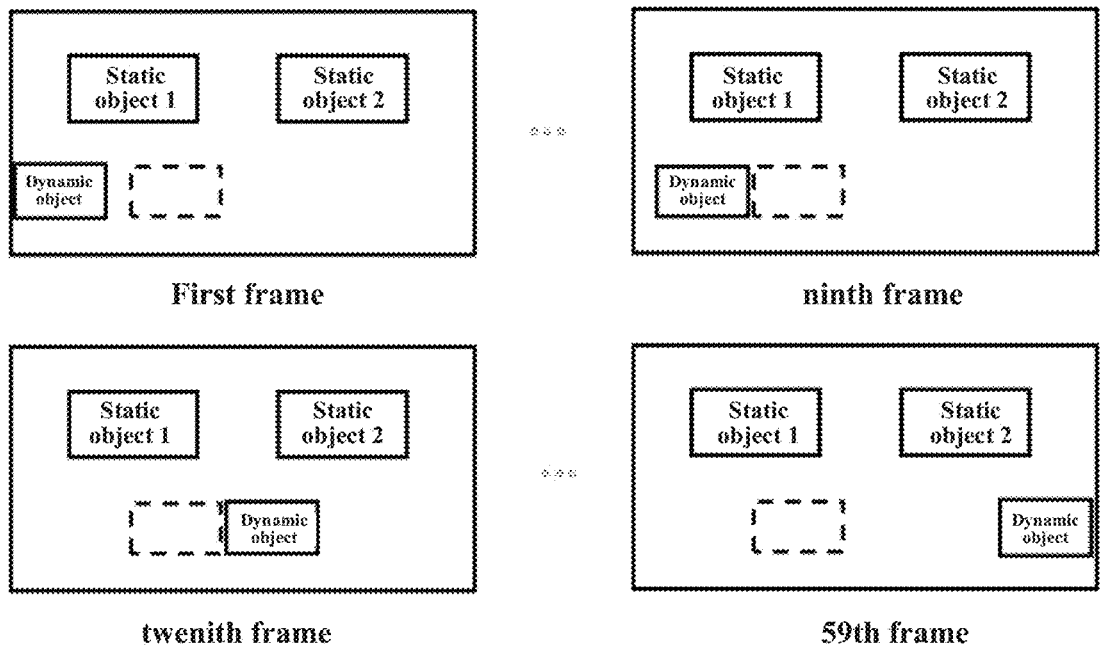

Then, all the frame data in which the dynamic object does not overlap with the dynamic object position in the above-mentioned particular image can be screened out from the shot frame data. As shown in FIG. 2B, as an example, the data from frame 1 to frame 9 and frame 20 to frame 59 are screened out.

Figure 2C:
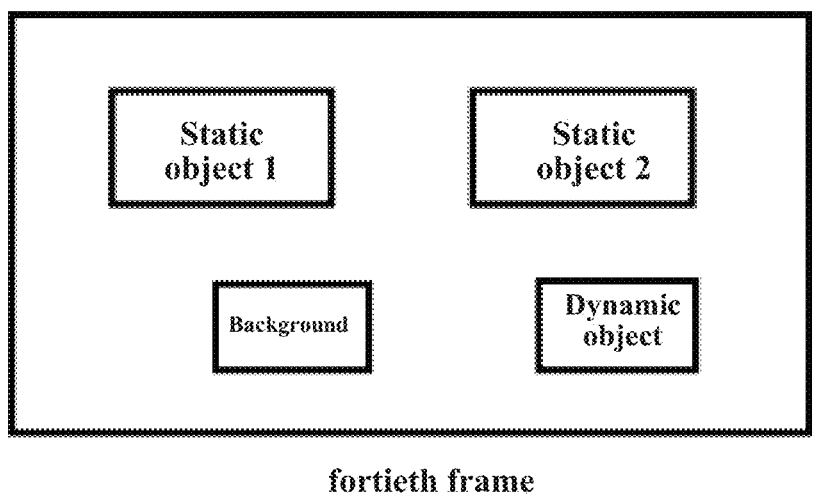

After that, position coordinates of the static object selected in the 15th frame data as the particular image can be analyzed, and then compared with the position coordinates of the corresponding static object in the data of each screened-out frame, and frame data which is of the size of the static object and has the smallest position offset can be used as reference data for subsequent processing, as shown in FIG. 2C, for example, the 40th frame data is selected.

Then, the content at the position of the dynamic object in the selected 15th frame data as a particular image can be replaced with the content in the data of the 40th frame.

Replacement based on the screened-out 40th frame data can be divided into two situations.

Figure 2D:
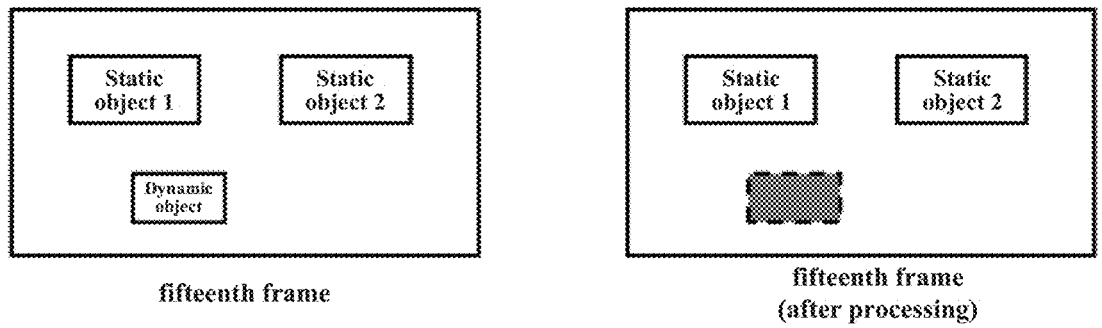

In one situation, if the size and position of the static object in the data of the 40th frame is the same as/consistent with the data of the 15th frame, then a picture in the data of the 40th frame which is located at a position corresponding to the position of the dynamic object in the data of the 15th frame (for example, the same position) and of the same size can be cut to supplement into the corresponding position in the 15th frame. In another situation, there will be a slight deviation between the size and position of the static object in the 40th frame data and the 15th frame data, in this way, the deviation between position and size of the static object in the two sets of data can be calculated first, and then based on the deviation value, the image in the 40th frame data at a position corresponding to the dynamic object can be converted accordingly (such as the cut position is slightly moved, the size is scaled, etc.), and then be supplemented into the corresponding position in the 15th frame. Therefore, a frame of data without dynamic objects is finally generated, and serves as a reference image for obtaining the final image, as shown in FIG. 2D.

According to an embodiment of the present disclosure, the processing for the dynamic object includes determining the motion condition of the dynamic object from a series of images, and in some examples, generating a motion trajectory of the dynamic object. For example, in a piece of video data obtained by shooting, the dynamic object may be an object moving in the video, or an object entering or leaving the video at the intermediate moment, therefore, the motion trajectory of the dynamic object can indicate the trace of the dynamic object moving in the video.

According to some embodiments, the processing circuit is further configured to: track a movement process of the dynamic object in the series of images from an image in which the dynamic object first appears to an image in which the dynamic object last appears to generate the motion trajectory. As an example, based on an object recognition algorithm, the entire movement process of the dynamic object in the video can be tracked to generate the trajectory. According to some embodiments, it can be obtained by connecting the positions in each image in which the dynamic object appears. For example, in some embodiments, the images used to connect lines to generate the trajectory may include images whose number is greater than or equal to a set threshold number. The set threshold number may, for example, be set empirically, so that it does not need to generate a trajectory for an object that appears in the video for a short time or that appear in few images, which can reduce possible interference in the generated image. In some embodiments, the images used to connect the lines to generate the trajectory may be continuous images, such as images shot sequentially, or images that are continuous in shooting time. In some embodiments, images used to connect lines to generate the trajectory may have discontinuities between some of the images, for example may be separated by few other images, such as a case that a moving object is temporarily occluded by any other passing object.

According to an embodiment of the present disclosure, the motion trajectory of the dynamic object may include a motion optical trajectory of the motion object. In particular, when performing slow-motion photography in night scenes, it is particularly desirable to obtain optical trajectories to improve the aesthetic of photo. Therefore, in some embodiments of the present disclosure, the processing circuit is further configured to: acquire optical information of the dynamic object in the series of images from an image in which the dynamic object first appears to an image in which the dynamic object last appears, and generate a motion optical trajectory of the dynamic object based on the motion trajectory of the dynamic object and the optical information.

In some embodiments, the optical information may include at least one of brightness information and color information of the dynamic object in the series of images from an image in which the dynamic object first appears to an image in which the dynamic object last appears. It should be noted that the optical information may also include other appropriate information, as long as the information can be used to generate the optical trajectory. In the present disclosure, various suitable ways may be employed to generate the optical trajectory. In some embodiments, the optical trajectory may be generated by means of various suitable algorithms. For example, the brightness information at various position of the dynamic object can be analyzed, and in combination with a light and shadow graffiti principle, the motion trajectory of the dynamic object can be converted into the optical trajectory.

In some embodiments, the processing circuit may be further configured to: for each image in the series of images from an image in which the dynamic object first appears to an image in which the dynamic object last appears, analyze optical information at each position on the dynamic object to acquire a highlight part of the dynamic object; and connect the highlight parts at the same position on the dynamic object in the series of images from an image in which the dynamic object first appears to an image in which the dynamic object last appears to generate a motion optical trajectory of the dynamic object.

In some embodiments, a highlight part on the dynamic object can be determined based on comparing brightness information of the dynamic object with brightness information of the image background part. Specifically, in slow shutter photography, whether the shot object can be displayed in the final image depends on its exposure proportion (exposure time and object brightness information). For a dynamic object, if the difference between the brightness of the object itself and the brightness of the road background the object passes is not very big, because the object stays at the same position for a short time, the time proportion of road exposure time will be much higher than that of the object, and then in the final imaging photo, the object will be very faint or even not displayed at all. If the brightness of a part of the object itself (such as car light) is much higher than the brightness of the road background, this can make up for the lack of exposure time, and the highlight part will be displayed in the final photo. This is also the reason why when shooting with a slow shutter speed, only the trajectories of the car lights are left, while other parts of the car are almost not displayed.

In an embodiment of the present disclosure, the motion trajectory is first obtained by tracking the dynamic object, and then each frame of data is analyzed to obtain the brightness value per unit time of the road background on the motion trajectory (in the case of a setting of 30 frames per second, the time unit for one frame of data is 1/30 second), which can be combined with the exposure time to derive the exposure proportion of the road background during the shooting process, and then the total brightness value of the road background can be estimated. The brightness value of each part of the dynamic object can obtained by analysis, and then be compared with the road background brightness value to obtain position coordinates of the high-brightness part (if it exists) on the dynamic object, and obtain the color information of the part. The highlight part of the dynamic object at the same position/part in each frame of data can be connected to generate a motion optical trajectory with its original color.

According to an embodiment of the present disclosure, the generated motion trajectory/motion optical trajectory of the dynamic object as described previously can be further processed. In some embodiments, optimization can be carried out according to the user's shooting needs, including removing some noises to make the generated motion trajectory/motion optical trajectory to be more continuous and smooth, where the noises may be caused by the fact that in addition to moving forward, meanwhile, the dynamic object also displaces in the left and right directions, such as a car temporarily changes routes.

In other embodiments, the trajectories of dynamic objects can also be screened. In some embodiments, a motion trajectory of a dynamic object used to generate the final image refers to the motion trajectory of the dynamic object that appears in more than a predetermined number of images in the series of images. The predetermined number may be appropriately set, such as set empirically. As an example, when there may be multiple dynamic objects in the shooting scene, a trajectory of a dynamic object that appear for a short time in the shot video can be deleted, thereby effectively avoiding relatively messy motion trajectories and emphasizing main long trajectories.

According to some embodiments of the present disclosure, the final image may be generated based on the processed image generated from the static object particular image and the obtained dynamic object motion trajectory. In some embodiments, the motion trajectory of the dynamic object can be synthesized into the processed image so as to generate the final image. The synthesis operation can be carried out in various suitable ways. For example, according to one embodiment, the motion trajectory can be directly superimposed on the corresponding position in the particular image of the static object. In particular, according to the position information of the generated trajectory, which for example, is determined based on the position information of the moving object in each image, the generated trajectory can be reflected to the corresponding position in the particular image.

In a structural example of the above device, the processing circuit 102 may be in the form of a general-purpose processor or a special-purpose processing circuit, such as an ASIC. For example, the processing circuit 120 can be constructed from a circuitry (hardware) or a central processing device, such as a central processing unit (CPU). In addition, the processing circuit 102 may carry a program (software) for operating the circuitry (hardware) or the central processing device. The program can be stored in a memory, for example, being arranged in the memory, or an external storage medium connected from the outside, and downloaded via a network (such as the Internet).

According to an embodiment of the present disclosure, the processing circuit 102 may include various units for implementing the above-mentioned functions, such as a processed image acquisition unit 104 for generating a processed image which does not contain image content relevant to the dynamic object, based on a particular image containing the static object selected among the series of images; a motion trajectory generation unit 106 for generating a motion trajectory of the dynamic object in at least some of the series of images; and a synthesis unit 108 for obtaining a final image on the basis of both of the processed image and the generated motion trajectory of the dynamic object. Each unit can operate as described above and will not be described in detail here.

In particular, the processing circuit 102 may further include an object identification unit 110, which is configured to identify at least one of static objects and dynamic objects in the image, and may operate as described above, which will not be described in detail here.

In particular, the processing circuit 102 may further include a selection unit 112, which is configured to select a particular image containing a static object from the series of images, which may operate as described above and will not be described in detail here.

In particular, the motion trajectory generation unit 106 may include an optical information acquisition unit 1062 which is configured to acquire the optical information of the dynamic object in the series of images from the image in which the dynamic object first appears to the image in which the dynamic object last appears, and an optical trajectory generation unit 1064 which is configured to generate a motion optical trajectory of the dynamic object based on the motion trajectory of the dynamic object and the optical information. Each unit can operate as described above and will not be described in detail here.

It should be noted that in FIG. 1, the object identification unit 110, the selection unit 112, the optical information acquisition unit 1062 and the optical trajectory generation unit 1064 are drawn with dotted lines, which is intended to illustrate that these units are not necessarily included in the processing circuit, or even does not exist. As an example, these unit may be in a terminal-side electronic device and outside the processing circuit, or may even be located outside the electronic device 10. It should be noted that although each unit is shown as a separate unit in FIG. 1, one or more of these units may be combined into one unit or split into multiple units.

It should be noted that the above-mentioned units are only logical modules divided according to the specific functions they implement, instead of being used to limit specific implementation methods. For example, they can be implemented in software, hardware, or a combination of software and hardware.

In actual implementation, each of the above units may be implemented as an independent physical entity, or may also be implemented by a single entity (for example, a processor (CPU or DSP, etc.), an integrated circuit, etc. In addition, the various units mentioned above are shown with dotted lines in the drawings to indicate that these units may not actually exist, and the operations/functions they implement may be implemented by the processing circuit itself.

It should be understood that FIG. 1 is only a schematic structural configuration of an electronic device for image processing. The electronic device 10 may also include other possible components, such as memory, network interfaces, controllers, etc., which are not shown for the sake of clarity. In particular, the processing circuit may be associated with a memory. For example, the processing circuit may be directly or indirectly connected to the memory (for example, other components may be connected in between) to access data relevant to image processing. Memory may store various data and/or information generated by processing circuitry 102. The memory may also be located within the terminal-side electronic device but external to the processing circuit, or even external to the terminal-side electronic device. The memory may be volatile memory and/or non-volatile memory. For example, memory may include, but not limited to, random access memory (RAM), dynamic random access memory (DRAM), static random access memory (SRAM), read only memory (ROM), and flash memory.

Figure 3:
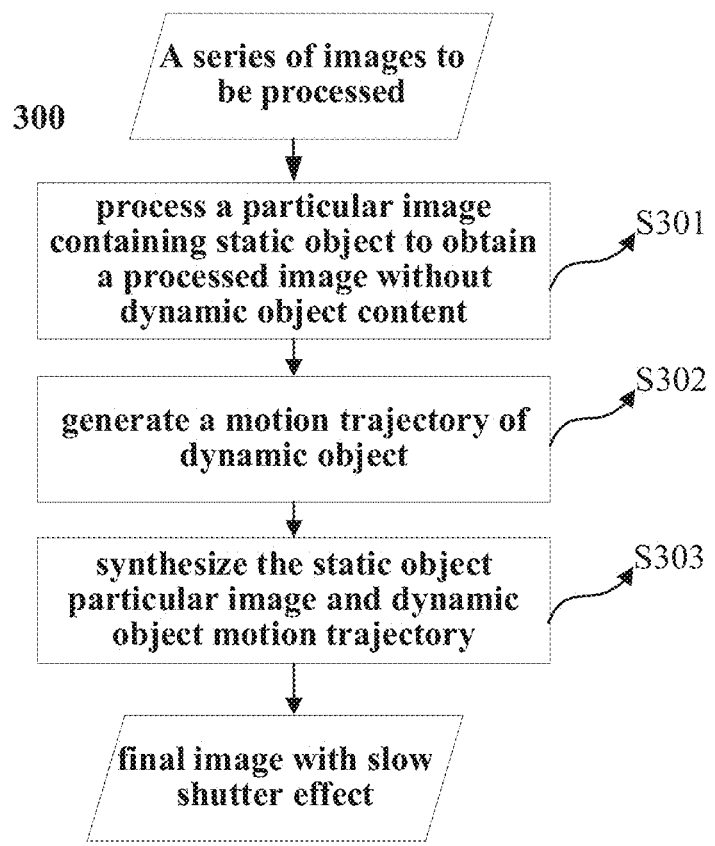
FIG. 3 shows a flowchart of an image processing method according to an embodiment of the present disclosure.

A flowchart of an image processing method according to an embodiment of the present disclosure will be described below with reference to FIG. 3. This image processing aims to process a series of images, the series of images being obtained by shooting a scene containing a static object and a dynamic object, as shown in FIG. 3, in the image processing method, in step S301, generating a processed image which does not contain image content relevant to the dynamic object, in step S302, generating a motion trajectory of the dynamic object in at least some of the series of images; and in step S303, obtaining a final image on the basis of both of the processed image and the generated motion trajectory of the dynamic object.

It should be noted that these steps may be performed by any appropriate device or device element, such as the aforementioned image processing device, a processing circuit in the image processing device, corresponding elements in the processing circuit, and the like. It should be noted that the image processing method according to embodiments of the present disclosure may also include other steps, such as various further processes described above. Moreover, these further processes can also be performed by appropriate equipment or equipment elements and will not be described in detail here.

Figure 4A:
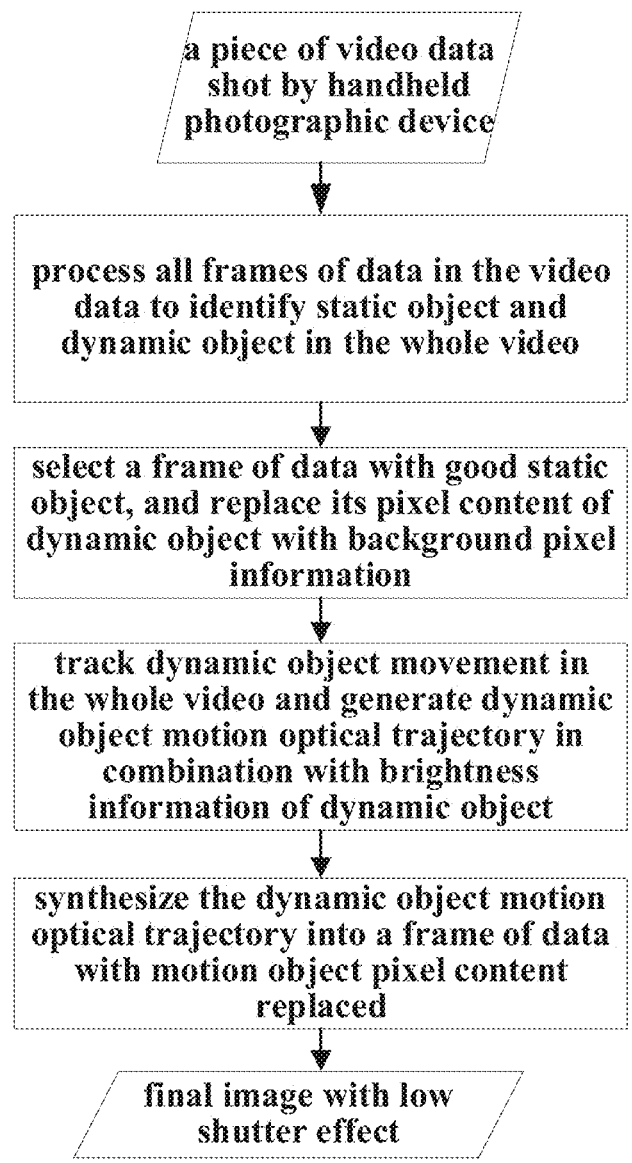
FIG. 4A shows an exemplary process of generating an image with a slow shutter photographic effect according to an embodiment of the present disclosure.

A basic flow chart of an exemplary image processing capable of achieving a slow shutter photographic effect according to an embodiment of the present disclosure will be described below with reference to FIG. 4A, in which a piece of video data shot by a user handhelding a photographic device is analyzed and a high-quality video with slow shutter photographic effect can be finally generated.

First, all the frame data in the shot piece of video data are analyzed, and by comparing the pixel information at each position and allowing a certain offset, the static objects and dynamic objects can be separated in the entire video.

Secondly, a frame of data with better performance can be selected, then the pixels of a dynamic object are removed therefrom, and then the background pixel information of the area can be supplemented with reference to pixel information in other frame data at similar positions, so as to obtain a frame of data containing only a static object, and this frame of data will serve as a reference image for final imaging. If the shooting is performed with the most common setting parameters of 30 frames of data per second, one frame of data only corresponds to a moment of $1/30$ second, even if the shake occurs in the entire shooting process, the clarity of the static object on one frame of data can be guaranteed.

Then, on the basis of identifying the dynamic object, the motion trajectory of the dynamic object can be tracked throughout the video, and then combined with the brightness information of the dynamic object at each position, a motion optical trajectory of the dynamic object can be generated.

Figure 4B:
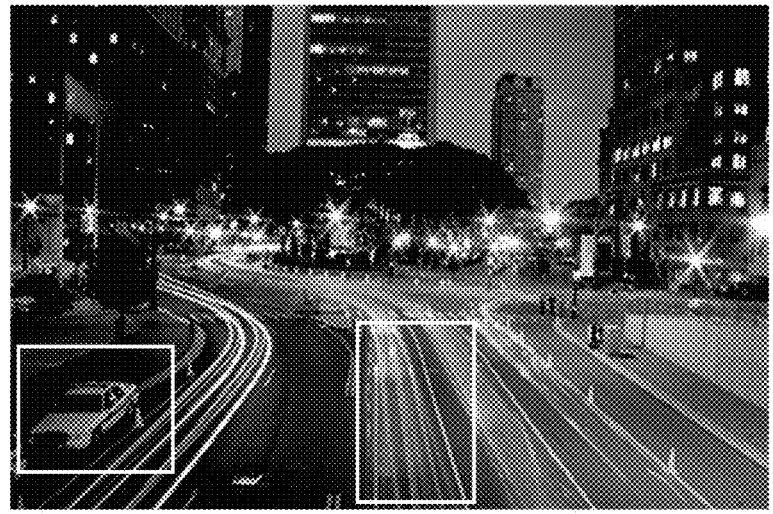
FIG. 4B shows an exemplary image with a slow shutter photographic effect.

Finally, the motion optical trajectory of dynamic object can be synthesized into the aforementioned frame of data containing only the static object to obtain the final image. FIG. 4B shows the result image with the slow shutter photographic effect. The box at the lower left corner of the figure identifies a stationary car in the image, which is a static object and will be clearly displayed. On the right of this box, a box identifies the motion optical trajectory of a vehicle running in the middle road area as a dynamic object.

It should be noted that the order of these operating steps is not so limited, but can be adjusted appropriately. For example, static frame image processing and generation of dynamic object motion trajectories can be performed at the same time, or static frame image data can be processed after obtaining dynamic object trajectories.

In this way, by analyzing a piece of video data shot by a user handhelding a photographic device and performing appropriate image processing, even if the shake occurs during the shooting process, a high-quality photo with a slow shutter photographic effect can be finally generated. Among them, the reference image used to synthesize the final photo can be automatically selected based on the shot video data, and even if the shake occurs during the entire shooting process, or even there exists a shake effect in some video data, an appropriate image can still be selected conveniently and accurately, which helps to improve the final imaging quality.

It should be noted that the image to be processed can be any appropriate image, such as a raw image obtained by a photographic device, or an image obtained by performing specific processing, such as preliminary filtering, de-aliasing, color adjustment, contrast adjustment, normalization and so on, on the raw image. It should be noted that the preprocessing operation may also include other types of preprocessing operations known in the art, which will not be described in detail here. In particular, the solution of the present disclosure can be used in combination with various image processing technologies in an existing photographic equipment. In particular, it can be used in combination with various white balance, exposure compensation, anti-shake processing, ghost compensation, etc. in the image. As an example, various aforementioned processes may be performed after the final image with a slow shutter photographic effect has been obtained through the solution of the present disclosure. As another example, the image shot by the user's handheld device can be subjected to the aforementioned various processes and then be applied the process of the present disclosure, so as to obtain a further optimized image with a slow shutter photographic effect. Of course, the aforementioned various processes can be executed synchronously during shooting.

In particular, the technical concept of the present disclosure can preferably be applied to existing photographic equipment through hardware (such as chips, electronic components, etc.), firmware or software, etc., so that when the photographic equipment is not fixed, such as being handheld or held in other non-fixed ways, a wonderful photo with slow shutter photographic effects can be shot, which can reduce the user's burden/weight in photography and simplify the user's photographic operations, without needing to use a tripod to fix the photography equipment.

In some embodiments, the image processing electronic device of the present disclosure can be integrated into a photographic device, for example, in the form of an integrated circuit or a processor, or even integrated into the existing processing circuit of the photographic device; or it can also be detachably attached to the photographic device as a separate device, for example, it can be used as a separate module, or it can be solidified with the camera lens on the photographic device, so that even if the camera lens is used onto other device, it can still use the solution of the present disclosure to process the shot image to obtain an image with a slow shutter photographic effect. In some embodiments, it can even be disposed on a remote device that can communicate with the photographic device, and in this case, the photographic device, after shooting, can transmit the obtained image to the remote device, and after the remote device performs image processing, the processed image can be transmitted back to the photographic device for display, or to other devices for display, the remote device may be a device that can be connected to the photographic device to control photography and/or display, such as a smartphone, portable electronic devices such as tablet computers, etc., or located in the device.

In some embodiments, the solution of the present disclosure can be implemented through a software algorithm, so that it can be easily integrated into various types of photographic devices, such as video cameras, cameras such as SLR cameras, mirrorless cameras, etc., as well as mobile phone photographic equipment. In particular, the method of the present disclosure can be executed by a processor of a photographic device as a computer program, instructions, etc., in order to perform image processing on shot images.

It should be noted that the photographic device to which the technical solution of the present disclosure can be applied may include various types of optical photographic devices, such as lenses installed on portable devices, photographic devices on drones, photographic devices in monitoring equipment, etc. However, the photographic device is not limited to this, and can also be any other suitable device, as long as the photographic device can continuously shoot over a specific period of time to obtain corresponding videos/photos when shooting images. The present disclosure can be used in many applications. For example, the present invention may be used to monitor, identify, track objects in still images or moving videos shot by a camera, and is particularly advantageous for camera-equipped portable devices (camera-based) mobile phones, and the like.

It should be noted that although the above is mainly described with reference to processing images to obtain slow shutter photographic effects, the solutions of the present disclosure may be applied to other situations in which images are processed to produce effects similar to slow shutter photographic effects. In particular, it is intended to obtain images or videos in which the static object images and dynamic object motion states can be combined. As an example, when a short-time video can be shot, and a combination of static objects and dynamic objects appears in the video, the concept of the present disclosure can be used to reasonably analyze the motion conditions of the dynamic objects, and combine them with the static objects to obtain a desired short video.

According to an embodiment of the present disclosure, a photographic device can be further provided, which includes an image acquisition apparatus configured to acquire a series of images, the series of images being shot for a scene including at least one of a static object and a dynamic object, and the aforementioned image processing device configured to perform image processing on a series of acquired images. According to an embodiment of the present disclosure, the image acquisition device may, for example, be any appropriate device designed to be able to acquire such a series of images, which may be implemented in various appropriate ways, for example, may include a camera head, a photographic device, etc. to acquire the image by shooting the scene, or acquiring the image from other photographic components of the photographic device, or even from a device other than the photographic device.

Figure 5:
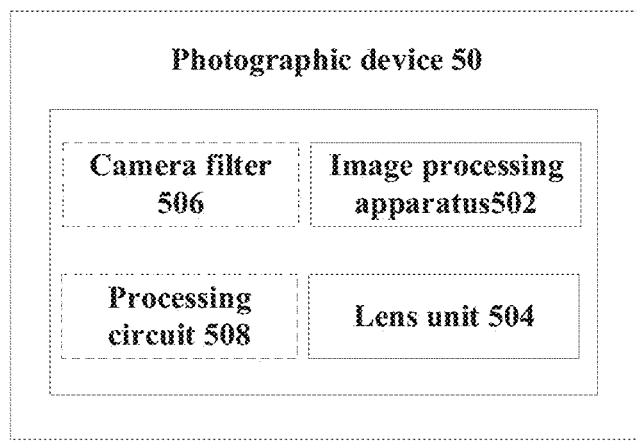
FIG. 5 illustrates a photographic device according to an embodiment of the present disclosure.

An exemplary implementation of the photographic device according to the present disclosure will be described below. FIG. 5 shows a block diagram of a photographic device according to an embodiment of the present disclosure. The photographic device 50 may include an image processing apparatus 502, which can be used to process the shot image in order to obtain a photo image with a slow shutter photographic effect, the apparatus can be implemented by an electronic device, such as the electronic device 10 for image processing according to the present disclosure described above.

The photographic device 50 may include a lens unit 504, which may include various optical lenses known in the art for imaging an object on a sensor by optical imaging.

The photographic device may further include an output device for outputting the photo image having a slow shutter photographic effect obtained by the image processing device. The output device may be in various appropriate forms, such as a display device, or may be a communication device for outputting photo images to other devices, such as servers, clouds, and the like.

The photographic device 50 may include photographic filters 506, which may include various photographic filters/light filters known in the art, which may be mounted to the front of the lens.

The photographic device 50 may also include a processing circuit 508 which may be used to process the obtained images, such as various pre-processing before image processing, or various post-processing after obtaining the image with slow shutter photographic effect, such as noise reduction, further beautification, etc. In the structural example of the above device, the processing circuit 508 may be in the form of a general-purpose processor or a special-purpose processing circuit, such as an ASIC. For example, the processing circuit 508 can be constructed from circuitry (hardware) or a central processing device such as a central processing unit (CPU). Additionally, the processing circuit 508 may carry programs (software) for operating the circuit (hardware) or central processing device. The program can be stored in a memory (such as being arranged in a memory) or an external storage medium connected from the outside, and downloaded via a network (such as the Internet).

In some embodiments, at least one of the lens unit 504, photographic filter 506, and processing circuitry 508 may be included in an image acquisition device. It should be noted that, although not shown, the image acquisition device may also include other components as long as the image to be processed can be obtained.

It should be noted that the photographic filter and processing circuit are drawn with dashed lines, which is intended to illustrate that these units do not necessarily have to be included in the photographic device 50, but may even be external to the photographic device 50 and connected by known means and/or communication. It should be noted that although each unit is shown as a separate unit in FIG. 5, one or more of these units may also be combined into one unit, or split into multiple units.

Figure 6:
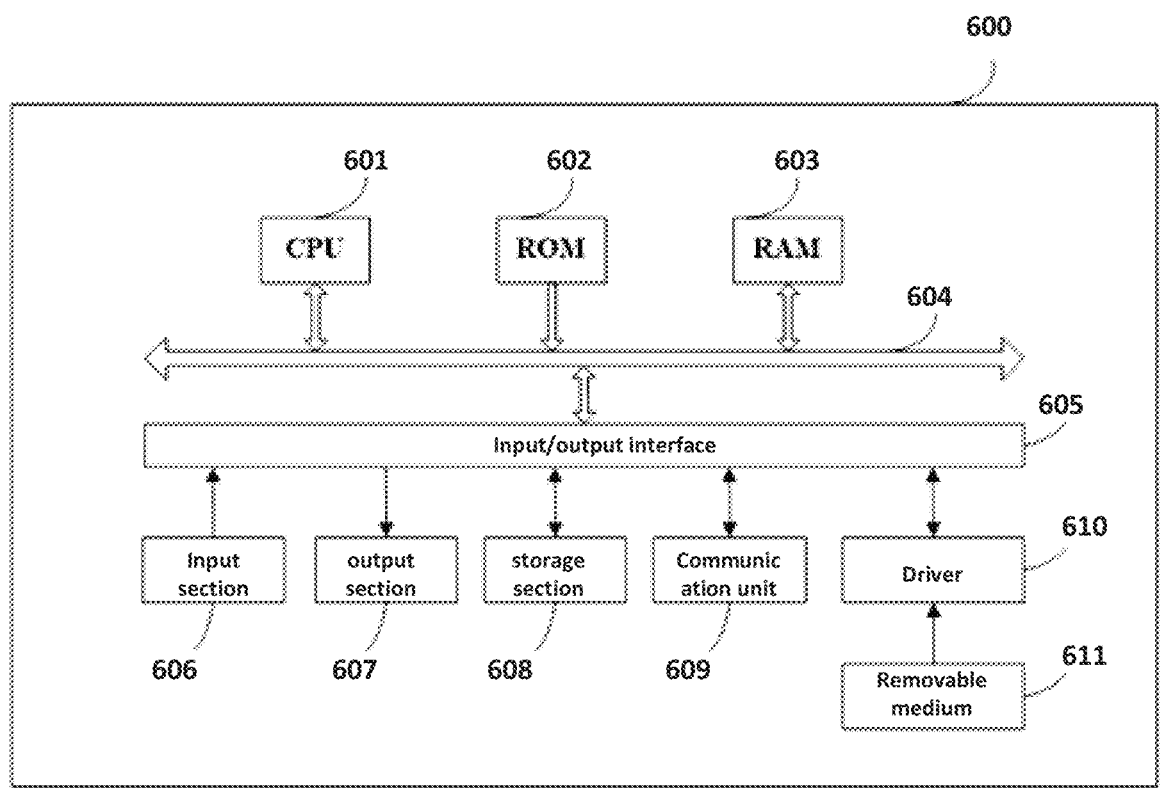
FIG. 6 shows a block diagram illustrating an exemplary hardware configuration of a computer system capable of implementing embodiments of the invention.

In addition, it should be understood that the above series of processes and devices can also be implemented through software and/or firmware. In the case of implementation by software and/or firmware, the program constituting the software can be installed from a storage medium or a network to a computer having a dedicated hardware structure, such as the general-purpose personal computer 600 shown in FIG. 6, the computer can perform various functions when being installed a variety of programs, FIG. 6 is a block diagram showing an example structure of a personal computer of an information processing device employable in an embodiment of the present disclosure. In one example, the personal computer may correspond to the above-described exemplary image processing device or terminal-side electronic device according to the present disclosure.

In FIG. 6, a central processing unit (CPU) 601 performs various processes according to a program stored in a read-only memory (ROM) 602 or a program loaded from a storage section 608 into a random access memory (RAM) 603. In the RAM 603, data required when the CPU 601 performs various processes and the like is also stored as needed.

The CPU 601, ROM 602, and RAM 603 are connected to each other via a bus 604. Input/output interface 605 is also connected to bus 604.

The following components are connected to an input/output interface 605: an input section 606, including a keyboard, a mouse, etc.; an output section 607, including a display, such as a cathode ray tube (CRT), a liquid crystal display (LCD), etc., and a speaker, etc.; a storage section 608, including hard disk, etc.; and a communication section 609, including network interface cards such as LAN cards, modems, etc. The communication section 609 performs communication processing via a network such as the Internet.

A driver 610 is also connected to the input/output interface 605 as needed. Removable media 611 such as magnetic disks, optical disks, magneto-optical disks, semiconductor memories, etc. can be installed on the drive 610 as needed, so that computer programs read therefrom can be installed into the storage section 608 as needed.

In the case where the above-described series of processes are implemented by software, the program constituting the software is installed from a network such as the Internet or a storage medium such as the removable medium 611.

Those skilled in the art should understand that this storage medium is not limited to the removable medium 611 shown in FIG. 6 in which the program is stored and distributed separately from the device to provide the program to the user. Examples of the removable media 611 include magnetic disks (including floppy disks (registered trademark)), optical disks (including compact disk read-only memory (CD-ROM) and digital versatile disks (DVD)), magneto-optical disks (including minidiscs (MD) (registered trademark)), and semiconductor memory. Alternatively, the storage medium may be a ROM 602, a hard disk contained in the storage section 608, or the like, in which programs are stored and distributed to users together with the device containing them.

It should be noted that the methods and devices described herein may be implemented as software, firmware, hardware, or any combination thereof. Some components may, for example, be implemented as software running on a digital signal processor or microprocessor. Other components may be implemented as hardware and/or application specific integrated circuits, for example.

Additionally, the methods and systems of the present invention may be implemented in a variety of ways. For example, the methods and systems of the present invention may be implemented by software, hardware, firmware, or any combination thereof. The order of the steps of the method as described above is illustrative only, and unless otherwise specifically stated, the steps of the method of the present invention are not limited to the order specifically described above. Furthermore, in some embodiments, the present invention may also be embodied as a program recorded in a recording medium, including machine-readable instructions for implementing the method according to the present invention. Therefore, the present invention also covers a recording medium storing a program for implementing the method according to the present invention. Such storage media may include, but not limited to, floppy disks, optical disks, magneto-optical disks, memory cards, memory sticks, and the like.

Those skilled in the art will appreciate that the boundaries between the operations described above are illustrative only. Multiple operations may be combined into a single operation, a single operation may be distributed among additional operations, and operations may be performed with at least partial overlap in time. Furthermore, alternative embodiments may include multiple instances of a particular operation, and the order of operations may be altered in various other embodiments. However, other modifications, changes and substitutions are also possible. Accordingly, the specification and drawings should be regarded as illustrative rather than restrictive.

In addition, embodiments of the present disclosure may also include the following illustrative examples (EE).

EE 1. An electronic device for processing a series of images, the series of images being obtained by shooting a scene containing at least one of a static object and a dynamic object, the electronic device comprises a processing circuit which is configured to:

generate a processed image which does not contain image content relevant to the dynamic object, based on a particular image containing the static object selected among the series of images;

generate a motion trajectory of the dynamic object in at least some of the series of images; and obtain a final image on the basis of both of the processed image and the generated motion trajectory of the dynamic object.

EE 2. The electronic device of EE 1, wherein the series of images are obtained by using a photographic device to perform shooting over a specific period of time in a case of the photographic device being not fixed.

EE 3. The electronic device of EE 1, wherein the series of images are obtained by using a photographic device to perform shooting over a specific period of time.

EE 4. The electronic device of EE 1, wherein the particular image is an image among the series of images in which the static object meets a specific requirement.

EE 5. The electronic device of EE 4, wherein the electronic device is further configured to:

compare each image in the series of images to a static object template, and select an image in the series of images that has the highest proximity to the static object template as the image among the series of images in which the static object meets a specific requirement.

EE 6. The electronic device of EE 5, wherein the proximity is the proximity between the static object in the image and the static object template with respect to at least one of clarity, personal expression, form, and color.

EE 7. The electronic device of EE 5, wherein the static object template is a static object data model trained based on a training image set.

EE 8. The electronic device of EE 1, wherein the processing circuit is further configured to:

track a movement process of the dynamic object in the series of images from an image in which the dynamic object first appears to an image in which the dynamic object last appears to generate the motion trajectory.

EE 9. The electronic device of any of EEs 1 to 8, wherein the processing circuit is further configured to:

acquire optical information of the dynamic object in the series of images from an image in which the dynamic object first appears to an image in which the dynamic object last appears, generate a motion optical trajectory of the dynamic object based on the motion trajectory of the dynamic object and the optical information.

EE 10. The electronic device of EE 9, wherein the optical information includes at least one of brightness information and color information of the dynamic object in the series of images from an image in which the dynamic object first appears to an image in which the dynamic object last appears.

EE 11. The electronic device of EE 1, wherein the processing circuit is further configured to:

for each image in the series of images from an image in which the dynamic object first appears to an image in which the dynamic object last appears, analyze optical information at each position on the dynamic object to acquire a highlight part of the dynamic object;

connect the highlight parts at the same position on the dynamic object in the series of images from an image in which the dynamic object first appears to an image in which the dynamic object last appears to generate a motion optical trajectory of the dynamic object.

EE 12. The electronic device of EE 11, wherein the highlight part on the dynamic object is determined based on comparing brightness information of the dynamic object with brightness information of an image background part.

EE 13. The electronic device of EE 1, wherein the motion trajectories of the dynamic object used to generate the final image include motion trajectories of dynamic objects appearing in more than a predetermined number of images in the series of images.

EE 14. The electronic device of any one of EEs 1-13, wherein the processing circuit can be further configured to:

replace image content relevant to the dynamic object in the particular image with background content to remove the image content relevant to the dynamic object from the particular image; and synchronize the motion trajectory of the dynamic object with the particular image after replacement to generate the final image.

EE 15. The electronic device of EE 14, wherein the processing circuit is further configured to:

screen out an image from the series of images in which the dynamic object position does not coincide with the dynamic object position in the particular image and the static object position have the smallest deviation from the static object position in the particular image; and determine the background content based on the content in the screened-out image at a position corresponding to the dynamic object position in the particular image.

EE 16. The electronic device of EE 15, wherein when the static object position in the screened-out image is consistent with the static object position in the particular image, the content in the screened-out image which is located at a position corresponding to the dynamic object position in the particular image and is of the same size is determined as the background content.

EE 17. The electronic device of EE 15, wherein when there is a deviation between the static object position in the screened-out image and the static object position in the particular image, the content in the screened-out image which is located at a position corresponding to the dynamic object position in the particular image and is adjusted based on the deviation value is determined as the background content.

EE 18. The electronic device of any one of EEs 1-17, wherein the processing circuit is further configured to:

identify an object which exists in each image in the series of images and whose position deviation is less than a specific threshold as the static object.

EE 19. The electronic device of any one of EEs 1-18, wherein the processing circuit is further configured to:

identify an object which does not exist in all images in the series of images, or an object which exists in all images in the series of images but whose position deviation is larger than a specific threshold as the dynamic object.

EE 20. An image processing method for processing a series of images, the series of images being obtained by shooting a scene containing a static object and a dynamic object, the image processing method comprises:

generating a processed image which does not contain image content relevant to the dynamic object, based on a particular image containing the static object selected among the series of images;

generating a motion trajectory of the dynamic object in at least some of the series of images; and obtaining a final image on the basis of both of the processed image and the generated motion trajectory of the dynamic object.

EE 21. The method of EE 20, wherein the series of images are obtained by using a photographic device to perform shooting over a specific period of time in a case of the photographic device being not fixed.

EE 22. The method of EE 20, wherein the series of images are obtained by using a photographic device to perform shooting over a specific period of time.

EE 23. The method of EE 20, wherein the particular image is an image among the series of images in which the static object meets a specific requirement.

EE 24. The method of EE 23, wherein the method further includes:

comparing each image in the series of images to a static object template, and selecting an image in the series of images that has the highest proximity to the static object template as the image among the series of images in which the static object meets a specific requirement.

EE 25. The method of EE 24, wherein the proximity is the proximity between the static object in the image and the static object template with respect to at least one of clarity, personal expression, form, and color.

EE 26. The method of EE 24, wherein the static object template is a static object data model trained based on a training image set.

EE 27. The method of EE 20, wherein the generating a motion trajectory of the dynamic object in at least some of the series of images, includes:
tracking a movement process of the dynamic object in the series of images from an image in which the dynamic object first appears to an image in which the dynamic object last appears to generate the motion trajectory.

EE 28. The method of any one of EEs 20-27, wherein the generate a motion trajectory of the dynamic object in at least some of the series of images, includes:
acquiring optical information of the dynamic object in the series of images from an image in which the dynamic object first appears to an image in which the dynamic object last appears,
generating a motion optical trajectory of the dynamic object based on the motion trajectory of the dynamic object and the optical information.

EE 29. The method of EE 28, wherein the optical information includes at least one of brightness information and color information of the dynamic object in the series of images from an image in which the dynamic object first appears to an image in which the dynamic object last appears.

EE 30. The method of EE 20, wherein the generating a motion trajectory of the dynamic object in at least some of the series of images, further includes:
for each image in the series of images from an image in which the dynamic object first appears to an image in which the dynamic object last appears, analyzing optical information at each position on the dynamic object to acquire a highlight part of the dynamic object;
connecting the highlight parts at the same position on the dynamic object in the series of images from an image in which the dynamic object first appears to an image in which the dynamic object last appears to generate a motion optical trajectory of the dynamic object.

EE 31. The method of EE 30, wherein the highlight part on the dynamic object is determined based on comparing brightness information of the dynamic object with brightness information of the image background part.

EE 32. The method of EE 20, wherein the motion trajectories of the dynamic object used to generate the final image comprise motion trajectories of dynamic objects appearing in more than a predetermined number of images in the series of images.

EE 33. The method of any one of EEs 20-32, wherein the generating a processed image which does not contain image content relevant to the dynamic object, based on a particular image containing the static object selected among the series of images, further comprises:
replacing image content relevant to the dynamic object in the particular image with background content to remove the image content relevant to the dynamic object from the particular image;
wherein the motion trajectory of the dynamic object is synchronized with the particular image after replacement to generate the final image.

EE 34. The method of EE 33, wherein the replacing image content relevant to the dynamic object in the particular image with background content, includes:
screening out an image from the series of images in which the dynamic object position do not coincide with the dynamic object position in the particular image and the static object position have the smallest deviation from the static object position in the particular image; and
determining the background content based on the content in the screened-out image at a position corresponding to the dynamic object position in the particular image.

EE 35. The method of EE 34, wherein when the static object position in the screened-out image is consistent with the static object position in the particular image, the content in the screened-out image which is located at a position corresponding to the dynamic object position in the particular image and is of the same size is determined as the background content.

EE 36. The method of EE 34, wherein when there is a deviation between the static object position in the screened-out image and the static object position in the particular image, the content in the screened-out image which is located at a position corresponding to the dynamic object position in the particular image and is adjusted based on the deviation value is determined as the background content.

EE 37. The method of any one of EEs 20-36, wherein the method further includes:
identifying an object which exists in each image in the series of images and whose position deviation is less than a specific threshold as the static object.

EE 38. The method of any one of EEs 20-36, wherein the method further includes:
identifying an object which does not exist in all images in the series of images, or an object which exists in all images in the series of images and whose position deviation is larger than a specific threshold as the dynamic object.

EE 39. A photographic device, includes:
an image acquisition apparatus configured to acquire a series of images which are obtained by shooting a scene containing at least one of a static object and a dynamic object, and;
the electronic device for image processing of any one of EEs 1-19, configured to perform image processing for the acquired series of images.

EE 40. A device including
at least one processor; and
at least one storage device storing instructions thereon, wherein the instructions, when executed by the at least one processor, cause the at least one processor to perform the method of any one of EEs 20-38.

EE 41. A storage medium storing instructions that, when executed by a processor, cause implementation of the method of any one of EEs 20-38.

EE 42. A computer program product comprising instructions which, when executed by a processor, cause implementation of the method of any one of EEs 20-38.

EE 42. A computer program comprising instructions which, when executed by a processor, cause implementation of the method of any one of EEs 20-38.

Although the present disclosure and its advantages have been described in detail, it should be understood that various changes, substitutions and alterations can be made without departing from the spirit and scope of the disclosure as defined by the appended claims. Furthermore, the terms "including," "comprising," or any other variations thereof of embodiments of the present disclosure are intended to cover a non-exclusive inclusion, such that a process, method, article, or device that includes a series of elements not only includes those elements, but also includes other elements not expressly listed, or elements that are inherent to the process, method, article or device. Without further limitation, an element defined by the statement "comprises a . . . " does not exclude the presence of additional identical elements in a process, method, article, or device that includes the stated element.

Although some specific embodiments of the present disclosure have been described in detail, those skilled in the art will understand that the above-described embodiments are only illustrative and do not limit the scope of the disclosure. It should be understood by those skilled in the art that the above-described embodiments can be combined, modified or replaced without departing from the scope and essence of the present disclosure. The scope of the disclosure is defined by the appended claims.

What is claimed is:

1. An image processor including
at least one processor; and
at least one memory comprising computer program codes, wherein the at least one memory and the computer program codes are configured to, through the at least one processor, cause the image processor to perform:
generating a processed image which does not contain image content relevant to the dynamic object, based on a particular image containing the static object selected among the series of images;
generating a motion trajectory of the dynamic object in at least some of the series of images; and
obtaining a final image on the basis of both of the processed image and the generated motion trajectory of the dynamic object,
wherein the at least one memory and the computer program codes are further configured to, through the at least one processor, cause the image processor to perform:
comparing each image in the series of images to a static object template, and
selecting an image in the series of images that has the highest proximity to the static object template as the image among the series of images in which the static object meets a specific requirement, wherein the proximity is the proximity between the static object in the image and the static object template with respect to at least one of clarity, personal expression, form, and color.

2. The image processor of claim 1, wherein the series of images are obtained by using a camera to perform shooting over a specific period of time in a case of the camera being not fixed.

3. The image processor of claim 1, wherein the at least one memory and the computer program codes are further configured to, through the at least one processor, cause the image processor to perform:
tracking a movement process of the dynamic object in the series of images from an image in which the dynamic object first appears to an image in which the dynamic object last appears to generate the motion trajectory.

4. The image processor of claim 1, wherein the at least one memory and the computer program codes are further configured to, through the at least one processor, cause the image processor to perform:
acquiring optical information of the dynamic object in the series of images from an image in which the dynamic object first appears to an image in which the dynamic object last appears, wherein the optical information comprises at least one of brightness information and color information of the dynamic object in the series of images from an image in which the dynamic object first appears to an image in which the dynamic object last appears,
generating a motion optical trajectory of the dynamic object based on the motion trajectory of the dynamic object and the optical information.

5. The image processor of claim 1, wherein the at least one memory and the computer program codes are further configured to, through the at least one processor, cause the image processor to perform:
for each image in the series of images from an image in which the dynamic object first appears to an image in which the dynamic object last appears, analyzing optical information at each position on the dynamic object to acquire a highlight part of the dynamic object, wherein the highlight part on the dynamic object is determined based on comparing brightness information of the dynamic object with brightness information of the image background part;
connecting the highlight parts at the same position on the dynamic object in the series of images from an image in which the dynamic object first appears to an image in which the dynamic object last appears to generate a motion optical trajectory of the dynamic object.

6. The image processor of claim 1, wherein the at least one memory and the computer program codes are further configured to, through the at least one processor, cause the image processor to perform:
replacing image content relevant to the dynamic object in the particular image with background content to remove the image content relevant to the dynamic object from the particular image; and
synchronizing the motion trajectory of the dynamic object with the particular image after replacement to generate the final image.

7. The image processor of claim 6, wherein the at least one memory and the computer program codes are further configured to, through the at least one processor, cause the image processor to perform:
screening out an image from the series of images in which the dynamic object position do not coincide with the dynamic object position in the particular image and the static object position have the smallest deviation from the static object position in the particular image; and
determining the background content based on the content in the screened-out image at a position corresponding to the dynamic object position in the particular image.

8. The image processor of claim 7, wherein when the static object position in the screened-out image is consistent with the static object position in the particular image, the content in the screened-out image which is located at a position corresponding to the dynamic object position in the particular image and is of the same size is determined as the background content, and/or
wherein when there is a deviation between the static object position in the screened-out image and the static object position in the particular image, the content in the screened-out image which is located at a position corresponding to the dynamic object position in the particular image and is adjusted based on the deviation value is determined as the background content.

9. An image processing method for processing a series of images, the series of images being obtained by shooting a scene containing a static object and a dynamic object, the image processing method comprises:
generating a processed image which does not contain image content relevant to the dynamic object, based on a particular image containing the static object selected among the series of images;

generating a motion trajectory of the dynamic object in at least some of the series of images; and obtaining a final image on the basis of both of the processed image and the generated motion trajectory of the dynamic object, wherein the generating a motion trajectory of the dynamic object in at least some of the series of images, further comprises:

for each image in the series of images from an image in which the dynamic object first appears to an image in which the dynamic object last appears, analyzing optical information at each position on the dynamic object to acquire a highlight part of the dynamic object, wherein the highlight part on the dynamic object is determined based on comparing brightness information of the dynamic object with brightness information of the image background part;

connecting the highlight parts at the same position on the dynamic object in the series of images from an image in which the dynamic object first appears to an image in which the dynamic object last appears to generate a motion optical trajectory of the dynamic object.

10. The image processing method of claim 9, wherein the series of images are obtained by using a camera to perform shooting over a specific period of time in a case of the camera being not fixed.

11. The image processing method of claim 9, further comprising:

comparing each image in the series of images to a static object template, and selecting an image in the series of images that has the highest proximity to the static object template as the image among the series of images in which the static object meets a specific requirement, wherein the proximity is the proximity between the static object in the image and the static object template with respect to at least one of clarity, personal expression, form, and color.

12. The image processing method of claim 9, wherein the generating a motion trajectory of the dynamic object in at least some of the series of images, comprises:

tracking the movement process of the dynamic object in the series of images from an image in which the dynamic object first appears to an image in which the dynamic object last appears to generate the motion trajectory.

13. The image processing method of claim 9, wherein the generate a motion trajectory of the dynamic object in at least some of the series of images, comprises:

acquiring optical information of the dynamic object in the series of images from an image in which the dynamic object first appears to an image in which the dynamic object last appears, wherein the optical information comprises at least one of brightness information and color information of the dynamic object in the series of images from an image in which the dynamic object first appears to an image in which the dynamic object last appears, generating a motion optical trajectory of the dynamic object based on the motion trajectory of the dynamic object and the optical information.

14. The image processing method of claim 9, wherein the generating a processed image which does not contain image content relevant to the dynamic object, based on a particular image containing the static object selected among the series of images, further comprises:

replacing image content relevant to the dynamic object in the particular image with background content to remove the image content relevant to the dynamic object from the particular image;

wherein the motion trajectory of the dynamic object is synchronized with the particular image after replacement to generate the final image.

15. The image processing method of claim 14, wherein the replacing image content relevant to the dynamic object in the particular image with background content, comprises:

screening out an image from the series of images in which the dynamic object position do not coincide with the dynamic object position in the particular image and the static object position have the smallest deviation from the static object position in the particular image; and determining the background content based on the content in the screened-out image at a position corresponding to the dynamic object position in the particular image.

16. The image processing method of claim 15, wherein when the static object position in the screened-out image is consistent with the static object position in the particular image, the content in the screened-out image which is located at a position corresponding to the dynamic object position in the particular image and is of the same size is determined as the background content, and/or, wherein when there is a deviation between the static object position in the screened-out image and the static object position in the particular image, the content in the screened-out image which is located at a position corresponding to the dynamic object position in the particular image and is adjusted based on the deviation value is determined as the background content.

17. A non-transitory storage medium storing computer program codes, which are configured to cause the at least one processor to perform:

generating a processed image which does not contain image content relevant to the dynamic object, based on a particular image containing the static object selected among the series of images;

generating a motion trajectory of the dynamic object in at least some of the series of images; and obtaining a final image on the basis of both of the processed image and the generated motion trajectory of the dynamic object, wherein the generating a motion trajectory of the dynamic object in at least some of the series of images, further comprises:

for each image in the series of images from an image in which the dynamic object first appears to an image in which the dynamic object last appears, analyzing optical information at each position on the dynamic object to acquire a highlight part of the dynamic object, wherein the highlight part on the dynamic object is determined based on comparing brightness information of the dynamic object with brightness information of the image background part;

connecting the highlight parts at the same position on the dynamic object in the series of images from an image in which the dynamic object first appears to an image in which the dynamic object last appears to generate a motion optical trajectory of the dynamic object.

18. The non-transitory storage medium of claim 17, wherein the computer program codes are further configured to cause the at least one processor to perform:

replacing image content relevant to the dynamic object in the particular image with background content to remove the image content relevant to the dynamic object from the particular image; and synchronizing the motion trajectory of the dynamic object with the particular image after replacement to generate the final image.

\* \* \* \* \*